United States Patent [19]
Imura

[11] 3,838,433
[45] Sept. 24, 1974

[54] ELECTRIC SHUTTER FOR A CAMERA

[75] Inventor: Toshinori Imura, Osaka, Japan

[73] Assignee: Minolta Camera Kabushiki Kaisha, Osaka, Japan

[22] Filed: Jan. 29, 1973

[21] Appl. No.: 327,856

Related U.S. Application Data
[63] Continuation of Ser. No. 54,130, July 13, 1970, abandoned.

[30] Foreign Application Priority Data
July 15, 1969   Japan.................................. 44-55834

[52] U.S. Cl..................................... 354/29, 354/31
[51] Int. Cl. ............................................ G03b 7/08
[58] Field of Search ........... 95/10 C, 10 CE, 10 CT, 95/10 CD, 63

[56] References Cited
UNITED STATES PATENTS
| | | | |
|---|---|---|---|
| 3,292,516 | 12/1966 | Sato et al........................... | 95/10 CE |
| 3,575,096 | 4/1971 | Ernisse................................ | 95/10 C |
| 3,581,635 | 6/1971 | Kitai.................................. | 95/10 CE |
| 3,654,843 | 4/1972 | Ueda et al. ....................... | 95/10 CE |
| 3,750,543 | 8/1973 | Eloranta et al.................... | 95/10 CD |

Primary Examiner—Samuel S. Matthews
Assistant Examiner—Russell E. Adams, Jr.
Attorney, Agent, or Firm—Watson, Cole, Grindle & Watson

[57] ABSTRACT

The present invention relates to an electric shutter for a camera, in which the aperture of the lens is controlled by a programmed operation so as to change along with the time by means of a set of sectors, more particularly, the invention relates to an electric shutter for a camera in which the aperture is opened along with the time until the diaphragm is fully opened. When the necessary exposure time is less than the exposure time corresponding to the fully opened aperture then the aperture is opened along with the time only up to a restricted aperture size and continues the exposure at such restricted aperture.

8 Claims, 14 Drawing Figures

ELECTRIC SHUTTER FOR A CAMERA

This is a continuation, of application Ser. No. 54,130, filed July 13, 1970, now abandoned.

BACKGROUND OF THE INVENTION

An electric shutter for a camera, in which the aperture of lens is utilized in controlling the exposure operation which aperture and exposure time are programmed so as to change along with the time by means of a set of sectors, in a manner already well known.

Such a shutter has the advantage that the program of the diaphragm aperture and the exposure time can be controlled by a single sector control ring, and when giving an exposure a successive picture image from a picture image at the minimum diaphragm aperture to a picture image at the aperture state decided in accordance with the exposure time, it is possible to form such an exposure in successive layers, so that the quality of the photographic picture image can be improved.

However, there is a drawback that when the view field gets dark and the exposure time gets longer than about one-fifteenths second, which is the time required for the diaphragm aperture to fully open in general, the ratio of the whole exposure time to the time required to fully open is increased and the photograph picture image is governed almost entirely by the picture image at the time when the diaphragm is fully opened, so that the quality of the photographic picture image can not be improved.

SUMMARY OF THE INVENTION

The electric shutter for a camera in accordance with the present invention eliminates the abovementioned drawback. The object brightness detection circuit built in the electric shutter control circuit controls the operation of an electromagnet before an exposure is given. When it is determined that the time needed for exposure is shorter than the time required for the sector aperture to be fully opened, the electromagnet controls the exposure under the condition that the sector control member increases the sector aperture along with the time up to the time corresponding to the sector aperture full opening. When it is determined that the time needed for the exposure is longer than the time required for the sector aperture to be fully opened, the electromagnet restricts the sector aperture increased along with the exposure time by said sector control member to a smaller value than the aperture full opening, and after opened up to the restricted sector aperture size the exposure is continued at that aperture as it is.

The object of the present invention is to provide an electric shutter for a camera, which obtains a proper exposure at a proper aperture of an image forming lens at all times, regardless of a short time exposure and a long time exposure.

Another object of the present invention is to provide an electric shutter for a camera, which is changeable for controlling an exposure in which the sector aperture and the exposure time are programmed in correspondence to the object brightness when the exposure time is shorter than the time required for the sector aperture to be fully opened, and to restrict the increase of sector aperture at a smaller aperture than the full opening when the exposure time is longer than the time mentioned above, and to obtain the proper exposure through the exposure of such restricted aperture at the subsequent exposure time.

Another object of the present invention is to provide an electric shutter for a camera, which makes it possible to select a restricted value of the shutter aperture at a long time exposure.

DESCRIPTION OF THE PREFERRED EMBODIMENT

Figure 1:
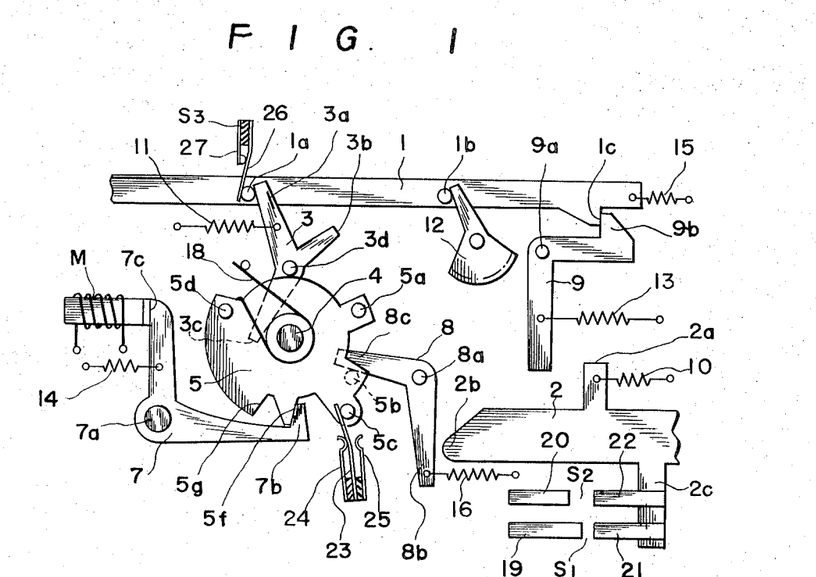
FIG. 1 is a side view of the essential portion of the formation of the first embodiment of the electric shutter for a camera in accordance with the present invention, showing the state before the release operation starts.
Figure 2:
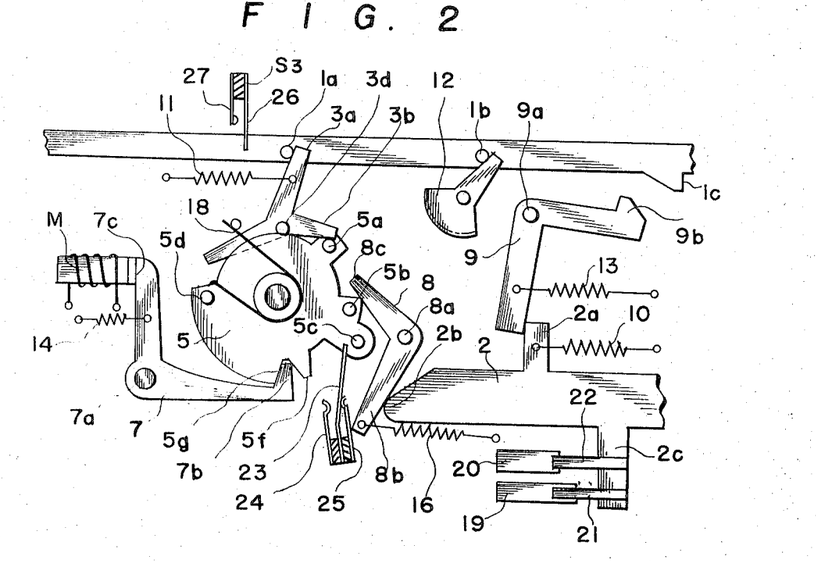
FIG. 2 is a side view of the essential portion at the time when the program exposure is performed in the embodiment shown in FIG. 1, after the release operation is finished.

In FIG. 1 and FIG. 2, sector control member 1, which is shown in a plan view, is designed easily to form into the shape of a ring such as the shutter ring, as well known in the prior art. On the sector control member, 1 there are provided a restraining portion 1c for engaging with the release lever described hereinafter, and two pins 1a, 1b sector control member 1 is pulled by sprng 15 to the right as shown in FIG. 1. The pin 1a engages with contact piece 26 of timing switch $S_3$, which is biased towards an open position so as to close the timing switch $S_3$ and contact 27 in the charge position shown in FIG. 1. The pin 1b always engages with first gear 12 of the governor, which is arranged for rotating in a counter-clockwise direction, so as to brake the pin and to enable the pin to move slowly at a constant speed when pulled by the spring 15 to the right.

Reference numeral 2 denotes a release rod movable to the left against spring 10 thereof by pushing the shutter button not shown in the drawings, and protrusion 2a thereof engages, in the moving progress to the left, with release lever 9 pivoted by axle 9a for turning in a counter-clockwise direction due to spring 13, so as to disengage pawl 9b from the restraining portion 1c of sector control member 1. And, on the end of release rod 2 there is formed working protrusion 2b, and on the side of the release rod 2 there is formed protrusion 2c provided with contact pieces 21, 22 for opening/closing contacts $S_1$, $S_2$ described hereinafter.

Control lever 3 having three arms 3a, 3b, 3c is pivoted by axle 3d and caused to rotate in a counter-clockwise direction by spring 11, and contact arm 3a is in engagement with pin 1a of the sector control member 1. Driving plate 5 is rotatably connected to axle 4 and cause to rotate in a counter-clockwise direction by spring 18, and provided with pins 5a, 5b, 5c, 5d and slant faces 5f, 5g of two engage teeth on the circumference thereof.

Engage pawl 7b formed on one end of change-over lever 7 pivoted by axle 7a and is caused to turn in a counter-clockwise direction by a weak spring 14 and engages with slant face 5f of the engagement teeth under the shutter charge condition and on the other end of the change-over lever 7, there is provided armature 7c facing to electromagnet M.

One arm 8b of restraining lever 8, which is pivoted by axle 8a and is caused to turn in a counter-clockwise direction by a spring 16, faces the working protrusion 2b of release rod 2 and the other arm 8c engages with the pin 5b of driving plate 5.

The protrusion 5a of driving plate 5 engages with driven arm 3b of control lever 3 on the turning position thereof and control arm 3c thereof engages with the pin 5b in the state shown in FIG. 1 when control lever 3 is turned clockwise, and in the state shown in FIG. 2 both are disengaged. Pin 5c engages with contact piece 23 on the charge position of driving plate 5 as shown in FIG. 1, so as to allow the contact piece 23 to come into contact with contact 24 against its elastic stress and by the turning of pin 5c, contact piece 23 is changed over to the contact 25 side.

With respect to protrusion 2c of release rod 2, in the moving progress to the left, first, contact piece 21 thereof comes into contact with contact 19 to close switch $S_1$ and then contact piece 22 thereof comes into contact with contact 20 to close switch $S_2$.

Figure 3:
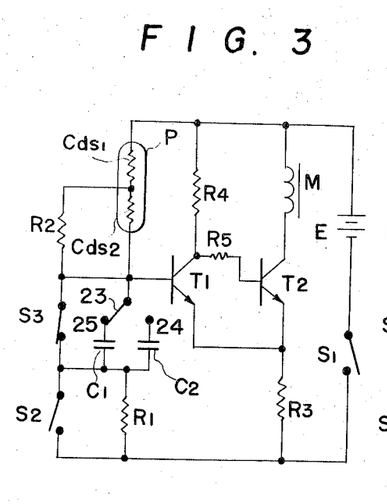
FIG. 3 shows an example of the electric control circuit in the embodiment shown in FIG. 1.

As regards the electric control circuit, one example thereof is shown in FIG. 3, wherein to the series connected body of electric power source E and the switch $S_1$, compound photoconductive element P for connecting two photoconductive elements $CdS_1$ and $CdS_2$ in series, and contact piece 23 changed over by the pin 5c are connected, and two contacts 24, 25 to which the contact piece 23 is changed over are connected to condensers $C_2$, $C_1$ in parallel with each other and relative resistance $R_1$ in series to the condensers $C_2$, $C_1$, and connected in parallel with timing switch $S_3$ for short-circuiting the switch and both condensers $C_1$, $C_2$, and switch $S_2$ for short-circuiting the relative resistance $R_1$. The connecting point of compound photoconductive element P and contact piece 23 forms the input to the base of transistor $T_1$, and the collector of transistor $T_1$ is connected to the positive side of the power source through the adjustable resistance $R_4$, and to the base of transistor $T_2$ through resistance $R_5$. The emitters of both transistors $T_1$, $T_2$ are connected to the negative side of the electric power source through bias resistance $R_3$, and the electromagnetic coil M is connected to the collector of transistor $T_2$. The resistance $R_2$ is a correction resistance connected in parallel with one photoconductive element $CdS_2$.

Since the present invention is formed as described above, upon moving release rod 2 to the left, first, working protrusion 2b thereof pushes to move arm 8b of restraining lever 8 to turn it clockwise against spring 16 and the other arm 8c recedes from pin 5b, and contact piece 21 comes into contact with contact 19 to close switch $S_1$. At this juncture timing switch $S_3$ therefore, has been closed, so that the object brightness detection circuit composed of compound photoconductive element P and relative resistance $R_1$ is formed, so as to detect whether or not the object brightness requires a long time exposure relative to time T required to fully open the sector (not shown in the drawings). That is, when the object brightness is low and requires more than the time T, transistor $T_2$ turns to the conductive state and electromagnet M is excited, so that armature 7c of change-over lever 7 is attracted by the electromagnet M and pin 5c allows contact piece 23 to connect to contact 24 side, and restraining pawl 7b is in contact with slant face 5f of the first tooth of driving plate 5 and accordingly the turning of the driving plate 5 is restrained in the state shown in FIG. 1.

As release rod 2 is further moved to the left, contact piece 22 comes into contact with contact 20, switch $S_2$ is closed, and relative resistance $R_1$ is short-circuited and its resistance goes to zero, so that transistor $T_2$ is still in the conductive state and the turning of driving plate 5 is restrained by restraining pawl 7b. In the wake of this fact, protrusion 2a comes into contact with release lever 9 to turn it clockwise against spring 13, so that pawl 9b thereof disengages from restraining portion 1c of sector control member 1. Sector control member 1 in turn is pulled by spring 15 to move relatively slowly to the right while pressing to move governer 12, and open timing switch $S_3$. Accordingly, compound photoconductive element P is connected to condenser $C_2$ via contact piece 23 and contact 24 (the reverse of the state shown in FIG. 3) to form the delay circuit and start to charge condenser $C_2$. Pin 1a of sector control member 1 in moving to the right pushes contact arm 3a of control lever 3 to turn it clockwise, however, control arm 3c thereof engages, in its turning progress, with pin 5d of driving plate 5 in engaging with the control arm 3c and stops on the spot to stop the right turning of sector control member 1 so as to restrict the sector aperture to the regular aperture prior to its full opening.

Afterwards, when condenser $C_2$ is charged to a certain voltage transistors $T_1$, $T_2$ are reversed and the current through electromagnet coil M is shut off, so that change-over lever 7 is released from the attraction by electromagnet coil M. Driving plate 5 then turns counter-clockwise through the turning force of spring 18 while slant face 5f thereof pushes away restraining pawl 7b, and pin 5a thereof comes into contact with driven arm 3b to turn control lever 3 counter-clockwise, so that contact arm 3a moves sector control member 1 to the left against spring 15 to close the sector so as to finish the exposure. After the exposure is finished release rod 2 is moved to the right, so that restraining lever 8 is returned to turn counter-clockwise by spring 16, and arm 8c thereof engages with pin 5b to turn driving plate 5 clockwise so as to return the driving plate 5 to the state shown in FIG. 1 to charge it.

Next, when the object brightness detection circuit detects that the object brightness is high and the exposure time is shorter than the time T, switch $S_1$ is closed and transistor $T_2$ turns to the cut off state, and driving plate 5 turns counter-clockwise following arm 8c of restraining lever 8 turned by working protrusion 2b, and just when the second tooth turns up to the position for facing to restraining pawl 7b of change-over lever 7, switch $S_2$ is closed and relative resistance $R_1$ is short-circuited, so that transistor $T_2$ is reversed to electrify and driving plate 5 is stopped once because slant face 5g engages with restraining pawl 7b of change-over lever 7. At this juncture on account of the turning of pin 5c, contact piece 23 is changed over from contact 24 to contact 25, and the compound photoconductive element P condenser $C_1$ is connected as shown in FIG. 3. Next, on account of protrusion 2a of release rod 2, when pawl 9b of release lever 9 is disengaged from restraining portion 1c of sector control member 1, sector control member 1 is moved to the right to turn control lever 3 clockwise, however, pin 5d has been receded from the position where it engages with control arm 3c, so that sector control member 1 becomes turnable up to the position where the sector is fully opened in accordance with the shorter exposure time than the time T, as shown in FIG. 2.

On the other side, on account of the movement to the right of sector control member 1, timing switch $S_3$ is opened to charge condenser $C_1$. When the condenser $C_1$ is charged up to the set voltage, transistor $T_2$ is reversed again to the shut off state and electromagnet coil M is demagnetized, and driving plate 5 pushes away change-over lever 7 to start to turn, and pin 5a engages with driven arm 3b to turn control lever 3 counter-clockwise and sector control member 1 moves to the left to close the sector so as to finish the exposure. Consequently due to the returning of release rod 2, driving plate 5 is returned in the same way as described above.

Figure 6:
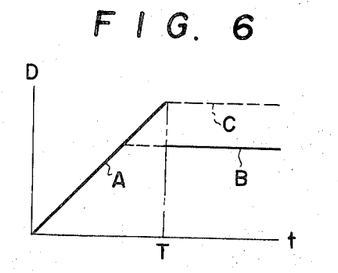
FIG. 6 is a diagram showing the relation between the exposure time and the diaphragm aperture in the embodiment shown in FIG. 1.

Thus, as shown in FIG. 6 in the prior art the exposure time and the sector aperture are in the relation going along lines A, C, while in the present invention they can be formed into the relation going along lines A, B.

Figure 7:
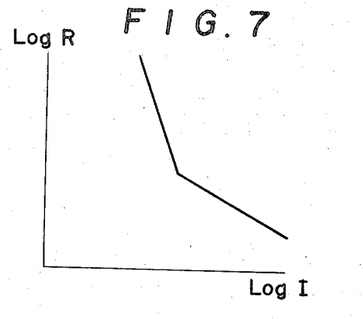
FIG. 7 is a diagram showing the characteristics of a photoconductive element used in the electric control circuit shown in FIG. 6.

In this embodiment, the reason why the compound electroconductive element P is put to use is as follows. That is, until the exposure time gets to the time T, the light intensity I and the exposure time maintain a certain functional relation, however, when the exposure time goes over T, the sector aperture is restricted to a fixed aperture and held thereat, therefore, in order to fix the exposure time, as far as the functional relation is prolonged as it is the exposure time which decreases. And accordingly, the light intensity I and the exposure time are required to be governed by a different functional relation using T as the boundary. For this purpose, the photoconductive element is required to have the crooked characteristics as shown in FIG. 7, so that the compound type is put to use.

Furthermore, in accordance with the present invention, when the exposure time gets to over T, the sector opening decreases to a smaller aperture size than the full opening, so that the exposure time computed by the delay circuit is required to increase using time T as the boundary and making a discontinuous jump. For this purpose it is necessary to change over the delay constant of the delay circuit using time T as the boundary. In pursuance of this intention, contact piece 23 is formed into a change-over switch changeable-over to contacts 24, 25, with condensers $C_2$ and $C_1$ of different capacity being connected to contacts 24 and 25 respectively.

Figure 4:
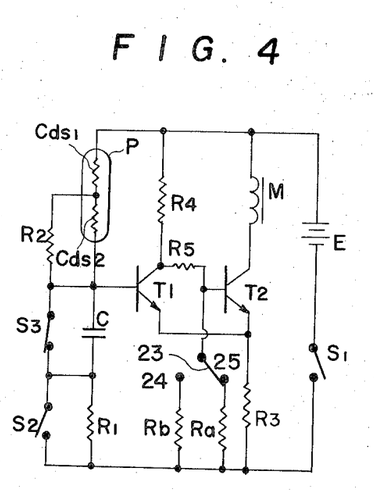
FIG. 4 shows another example of the electric control circuit in the embodiment shown in FIG. 1.
Figure 5:
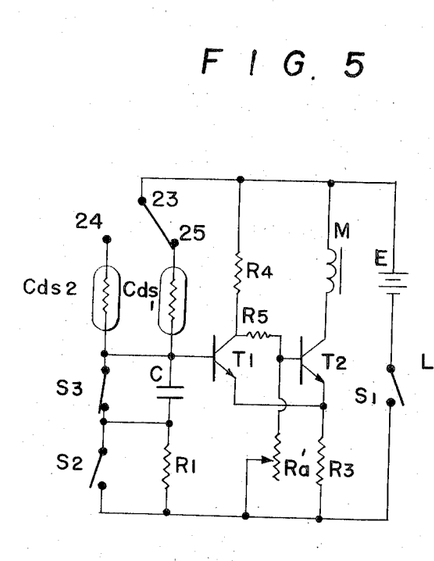
FIG. 5 shows further another example of the electric control circuit in the embodiment shown in FIG. 1.

As shown in FIG. 4, instead of changing-over to the condensers, change-over switch 23, 24, 25 can be arranged to change-over to base resistances $R_b$, $R_a$ of transistor $T_2$ so as to change the reverse input voltage of the switch circuit. Furthermore, as shown in FIG. 5, change-over switch 23, 24, 25 can be arranged to changeover photoconductive elements $CdS_1$, $CdS_2$ to be connected to delay condenser C.

Figure 8:
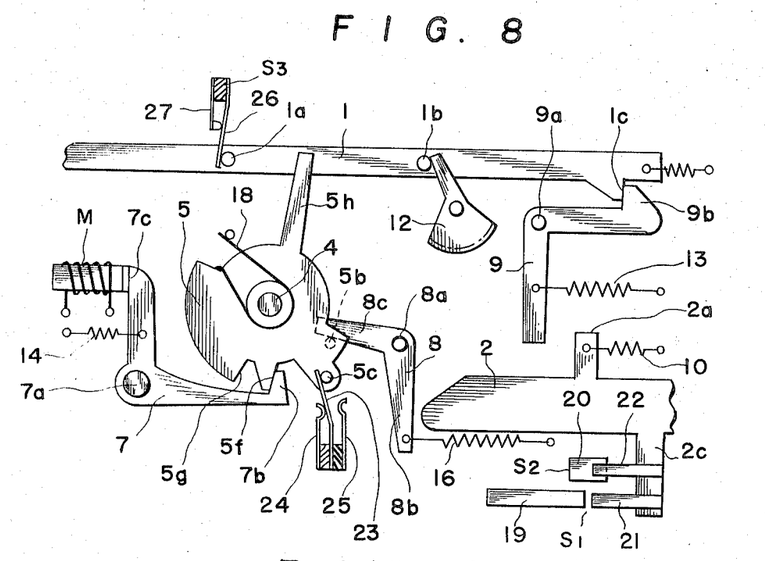
FIG. 8 is a side view of the essential portion of the formation of the second embodiment of the electric shutter in accordance with the present invention, showing the state before the release operation starts.
Figure 9:
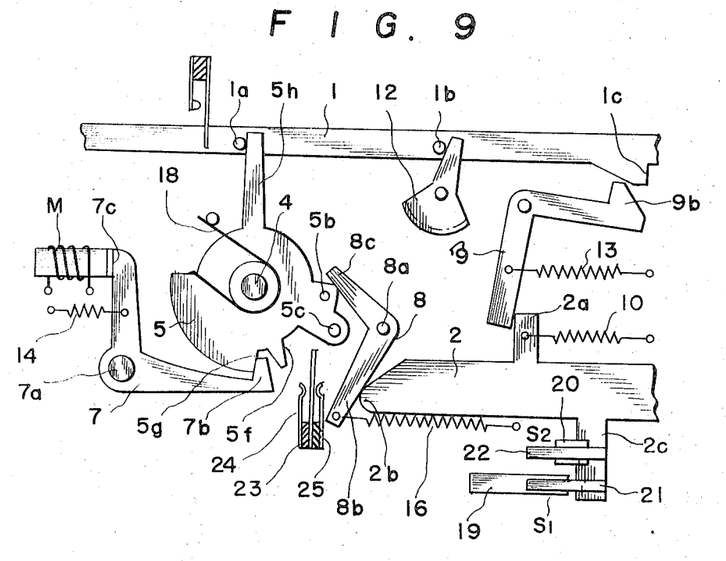
FIG. 9 is a side view of the essential portion at the time when the exposure is performed under the condition that the sector aperture is restricted, in the second embodiment shown in FIG. 8 after the release operation is finished.

In the second embodiment shown in FIG. 8 and FIG. 9, control lever 3 and driving plate 5 provided in the aforementioned first embodiment are formed as a single unit, and the relation between the excitation and demagnetization of the electromagnet coil effected by the object brightness detection circuit is in the reverse relation of the first embodiment. That is, switch $S_2$ is biased so as to be ordinarily closed and after switch $S_1$ is closed through the release operation, the switch 52 is opened. Accordingly when the exposure time is less than time T, electromagnet M is excited by closing switch $S_1$, and in the case of that the exposure time is greater than time T even though switch 5 is closed electromagnet M is not excited but is only excited by opening switch $S_2$.

As shown in FIG. 8, in this embodiment control lever 3 is removed and on driving plate 5 control arm 5h is formed instead of pins 5a, 5b so as to be on the right moving path of pin 1a of sector control member 1. Contact piece 22 of switch $S_2$ is always in contact with contact 20 and when release member 2 is operated contact piece 21 of switch $S_1$ comes into contact with contact 19 to close switch $S_1$. When the release operation is furthered, contact piece 22 of switch $S_2$ is detached from contact 20 so as to open switch $S_2$. The other formations are the same as those in the first embodiment.

Figure 10:
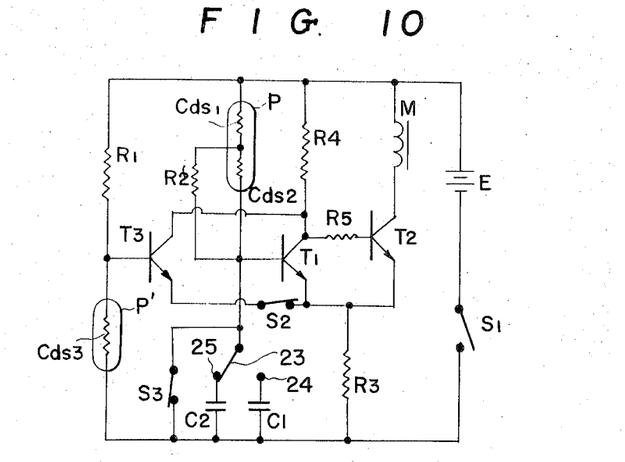
FIG. 10 shows the electirc control circuit in the second embodiment shown in FIG. 8.

The electric control circuit thereof is shown in FIG. 10, wherein a delay circuit composed of compound photoconductive element P and condensers $C_1$, $C_2$ connected to the element P through change over switch 23, 24, 25 is connected in parallel with a brightness detection circuit. The brightness detection circuit is composed of the relative resistance $R_1$ and photoconductive element P'. The connecting point of the delay and the detection circuits is connected to the base of transistor $T_3$. The transistor $T_3$ and transistor $T_1$ connected to the delay circuit are connected to each other through their respective collector and their emitters are connected to each other through switch $S_2$. The others formations are the same as those in the circuit shown in FIG. 4.

Now, in the case where an object is light and the shorter exposure time than the time T is required, by closing switch $S_1$ transistor $T_1$ is turned to OFF and the resistance of photoconductive element $CdS_3$ gets larger than the resistance value of relative resistance $R_1$. The transistor $T_3$ is thereby turned to OFF and accordingly transistor $T_2$ is turned to ON and changeover lever 7 is attracted by electromagnet M. Accordingly even when arm 8c of restraining lever 8 releases the restraining against pin 5b restraining pawl 7b is still in engagement with slant face 5f of the first tooth of driving plate 5 to check the counter-clockwise turning of driving plate 5, and accordingly control arm 5h stays in the position separated from pin 1a to permit sector control member 1 to move to the right up to the full opening.

In the case where the object brightness is dark and the resistance value of photoconductive element P' is high as compared with relative resistance $R_1$, transistor $T_3$ is turned to ON. The transistor $T_2$ is thereby turned to OFF and as restraining lever 8 turns, driving plate 5 turns pushing away restraining pawl 7b of change-over lever 7 by slant face 5f of the first tooth of driving plate 5. When the second tooth turns up to the position for facing to restraining pawl 7b, switch $S_2$ is opened so that transistor $T_2$ is governed only by transistor $T_1$ to reverse to ON, and restraining pawl 7b engages with slant face 5g of the second tooth and the driving plate is stopped once on the spot. That is, control arm 5h stays in the position close to pin 1a to restrict the movement towards the right of pin 1a and hold the sector aperture in the restricted value, so that on account of the progress of the subsequent release operation the movement towards the right of sector control member 1 is started and simultaneously the charging of delay condenser $C_1$ or $C_2$ is started. When the given voltage is attained, transistor $T_2$ is reversed to turn to OFF, and along with the start of the counter-clockwise turning of driving plate 5 control arm 5h pushes to move pin 1a to the left so as to drive sector control member 1 to close, in the same manner as in the first embodiment.

Figure 11:
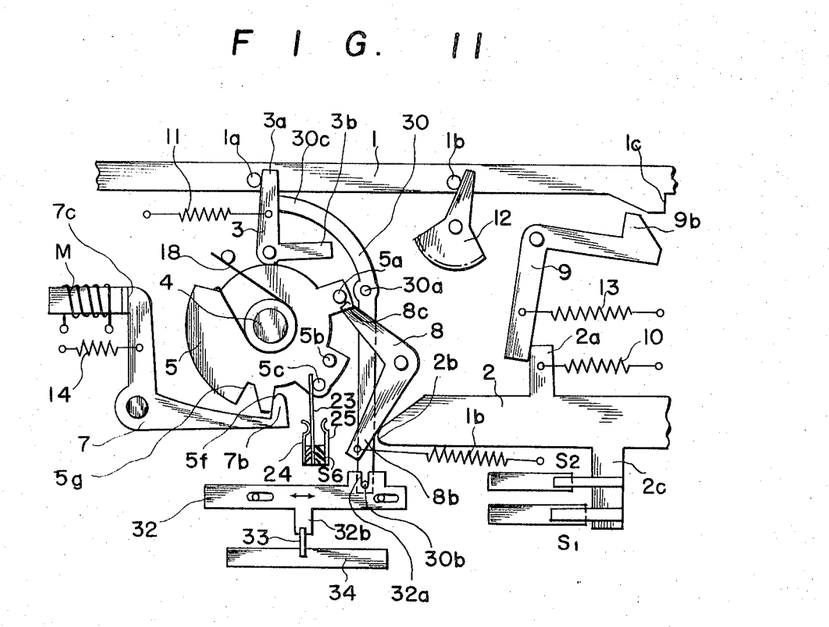
FIG. 11 is a side view of the essential portion of the formation of the third embodiment of the electric shutter in accordance with the present invention, showing the state at the time of the release operation when the exposure which makes it possible to select the restriction of the diaphragm aperture to be obtained.

FIG. 11 shows the third embodiment in accordance with the present invention, which is formed so to be able to manually set up the sector aperture at will, in the case where the exposure time detected by the detection circuit becomes longer than the time T. In this case, when the exposure time detected becomes longer than the time T, switch $S_6$ is opened/closed by turning through angles equivalent to one tooth of driving plate 5 so as to light lamp W in the electric control circuit shown in FIG. 12. The switch $S_6$ can be arranged to interlock with change-over switch 23, 24, 25. In the same way as in the first embodiment, when the exposure time detected is longer than T, even though switch $S_1$ is closed restraining pawl 7b is still in engagement with slant face 5f of the first tooth and contact piece 23 is in contact with contact 24, and switch $S_6$ is closed to light lamp W. In such a case, by moving to manually adjust manual operation plate 32 in the direction shown by the arrow in FIG. 11, upper end 30c of connecting lever 30 moves to the right and left in the opposite direction to the manual operation plate 32 because fork portion 32a of the operation plate 32 engages with pin 30b provided on the lower end of the connecting lever 30 connected rotatably to axle 30a. On the other side, as the control lever 3 which engaging with sector control member 1, turns in the clockwise direction contact arm 3a engages with the upper end 30c so as to restrict the movement towards right of sector control member 1.

Figure 12:
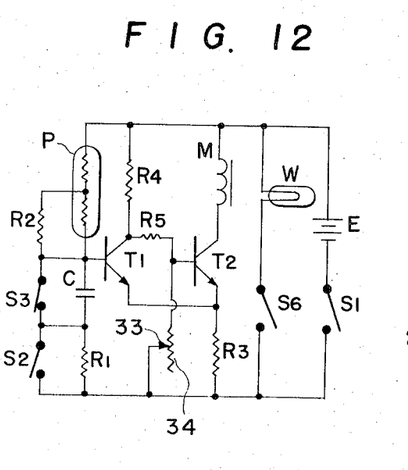
FIG. 12 shows the electric control circuit in the third embodiment shown in FIG. 11.

On the protrusion 32b provided on lower side of the manual operation plate 32, electric brush 33 is formed so as to constitute a variable resistance by sliding on sliding resistance 34. The variable resistance is equipped to make the base resistance of transistor $T_2$ variable, as shown in FIG. 12, and make the reverse input voltage of the switching circuit composed of transistors $T_1$, $T_2$ variable in interlocking the set-up of the sector aperture by the manual operation plate 32, so as to obtain the proper exposure time.

In the aforementioned embodiment, when the exposure time detected is shorter than T, even though switch $S_1$ is closed the electromagnet M is not excited, so that slant face 5f of the first tooth turns pushing away restraining pawl 7b. When switch $S_2$ is closed, slant face 5g of the second tooth engages with restraining pawl 7b, switch $S_6$ is opened, and lamp W is lit. In this case, upper end 30c of connecting lever 30 is moved up to the position where the aperture can be fully opened.

Figure 13:
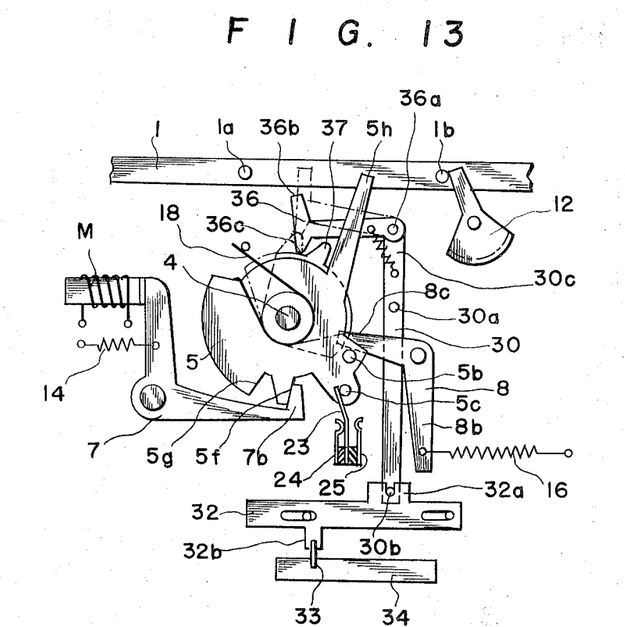
FIG. 13 is a side view showing the formation of the fourth embodiment in accordance with the present invention.
Figure 14:
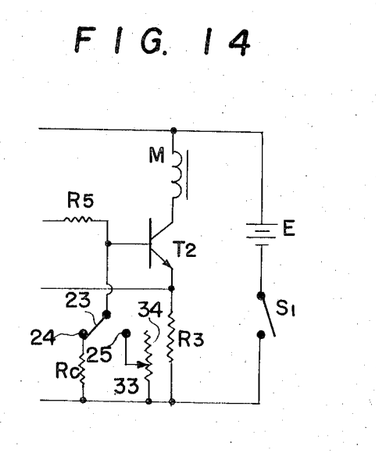
FIG. 14 is a partial view of the electric control circuit in the fourth embodiment shown in FIG. 13.

In the aforementioned embodiment, determining whether the exposure time is longer or shorter than the time T is accomplishd by the operation of the detection circuit. The sector aperture is set up, however, in the fourth embodiment shown in FIG. 13 and FIG. 14, such that in the case where the exposure time is long the sector aperture is set up beforehand and in the case where the exposure time is short, the sector aperture can be fully opened automatically. In this embodiment, the closing of the sector is brought about, in the same manner as in the second embodiment, by means of control arm 5h of driving plate 5, and on the side for restricting the aperture from here, there is provided link 36 for restricting the aperture, one end of which is connected to lever 30 similar to the connecting lever in the third embodiment by means of axle 36a. Protrusion 36c of the link 36 engages with control cam plate 37 connected in a body with driving plate 5 by coaxial axle 4, and control protrusion 36b of the link 36 is arranged to go in or out of the right moving path of pin 1a of sector control member 1. Accordingly, when the detection circuit detects a shorter exposure time than the time T, the restraining pawl 7b engages with slant face 5f of the first tooth of driving plate 5 and the turning of the driving plate 5 is checked and control cam 37 allows control protrusion 36b to recede out of said moving path. When the detection circuit detects a longer exposure time than the time T, the restraining pawl 7b is pushed out by the first tooth and engages with slant face 5g of the second tooth, control cam plate 37 pushes up link 36 on account of the turning through angles equivalent to one tooth of said driving plate 5, and control protrusion 36b of the link 36 projects to the set-up position in the right moving path of pin 1a. In this case, as shown in FIG. 14, variable resistances 33, 34 in the third embodiment are formed to be changed over to fixed resistance Rc by changeover switch 23, 24, 25, while the other electrical control circuits are not shown in the drawing but are the same as those in the second embodiment.

I claim:

1. An exposure control device for a photographic camera of the type having a common diaphragm and shutter blade mechanism, comprising:

an operating member for determining the size of the diaphragm aperture and movable between a first position for closing said diaphragm aperture and a second position for opening said diaphragm aperture;

means for driving said operating member between said first and second positions;

means for stopping said operating member at a predetermined position between said first and second positions;

means for detecting scene light and for determining whether the brightness thereof is higher or lower than a predetermined level;

means for moving said means for stopping to a predetermined position with said scene light lower than said predetermined level whereby said diaphragm is set at an opening less than full opening;

means for automatically timing exposure in accordance with scene light resulting from said diaphragm opening set by said means for stopping at said predetermined position.

2. An exposure control device as in claim 1, further comprising means for adjusting said means for timing in accordance with the detection of said scene light.

3. An exposure control device as in claim 2, further comprising means for releasing said means for stopping to terminate exposure and including an electromagnet actuated by said detecting means for detecting;

means for retarding the movement of said operating member between said first position to said second position; and said means for adjusting includes a change-over switch operated by said electromagnet.

4. An exposure control device as in claim 1, wherein said means for timing comprises two photoconductive elements in series with one another and connected to said means for timing through said change-over switch and at least one of said photoconductive elements is connected to said means for detecting prior to the actuation of said change-over switch.

5. An exposure control device as in claim 1, wherein said means for releasing includes an electromagnet actuated by said means for detecting and said means for timing;

a driving member movable from a cocked position to a rest position for controlling said means for stopping and for driving said operating member from a position for determining the size of said diaphragm aperture to said first position; and a retaining member controlled by said electromagnet for retaining said driving member at said cocked position.

6. An exposure control device as in claim 5, wherein said means for detecting actuates said electromagnet to retain said driving member at said cocked position whereby said means for stopping stops said operating member between said first and second positions with said scene light lower than said predetermined level; and said means for releasing is actuated by said means for detecting with said scene light greater than said predetermined level to disengage said means for stopping and release said operating member.

7. An exposure control device as in claim 6 further comprising indicating means connected by a manually operated switch to said electromagnet to indicate whether the exposure time determined by said means for detecting is longer or shorter than the time for said operating member to be driven from said first position to said second position.

8. An exposure control device for a photographic camera of the type having a common diaphragm and shutter blade mechanism, comprising an operating member for determining the size of the diaphragm aperture as a function of the position thereof;

means for driving said operating member from a first position to close said diaphragm to a second position to fully open the same;

means for stopping said operating member at a manually set position between said first and second positions;

means for detecting scene light and for determining whether the brightness thereof is higher or lower than a predetermined level;

indicating means responsive to said means for detecting;

means for timing including a photoconductive element for automatically controlling exposure; and means for adjusting said means for timing in accordance with the brightness determined by said means for detecting.

* * * * *